United States Patent [19]

Swartzendruber

[11] 4,044,920
[45] Aug. 30, 1977

[54] LOAD CELL AND CONTROL FOR BULK BIN

[75] Inventor: Ray E. Swartzendruber, Syracuse, Ind.

[73] Assignee: Chore-Time Equipment, Inc., Milford, Ind.

[21] Appl. No.: 654,165

[22] Filed: Feb. 2, 1976

[51] Int. Cl.² .......... B67D 5/08; G01G 3/14; G01L 5/12
[52] U.S. Cl. .......... 222/58; 222/76; 222/77; 73/141 A; 177/211
[58] Field of Search .......... 222/58, 56, 52, 76, 222/77; 73/141 A; 177/211

[56] References Cited

U.S. PATENT DOCUMENTS

| | | | |
|---|---|---|---|
| 2,472,047 | 5/1949 | Ruge | 73/141 A |
| 2,984,387 | 5/1961 | White | 222/58 |
| 3,107,820 | 10/1963 | Turner | 222/58 |
| 3,505,790 | 4/1970 | Rothemich | 222/56 X |
| 3,525,991 | 8/1970 | Kohler | 177/211 |
| 3,621,927 | 11/1971 | Ormond | 177/211 |

OTHER PUBLICATIONS

W. C. Dillon & Co., Bulletin R-8 of Nov. 1962, p. 14, and covers.

*Primary Examiner*—Stanley H. Tollberg
*Assistant Examiner*—Hadd Lane
*Attorney, Agent, or Firm*—Olson, Trexler, Wolters, Bushnell & Fosse, Ltd.

[57] ABSTRACT

Apparatus is provided for precisely measuring the weight of even large amounts of feed stored in bulk feed storage bins. This apparatus includes a number of electrical load cells supported upon a foundation. The weight of the bulk feed bins and any feed contained therein is, in turn, supported upon the load cells by bin support legs. If desired, an interconnecting platform can be provided to support a number of feed bins and their legs upon several cells. In response to weight-induced deformation of a load cell element, electrical signals are transmitted to electrical processing circuitry. This circuitry can provide a display of the weight of feed remaining in the bin, the number of feedings remaining in the bin at a given weight increment of feed, the presence or absence of a minimal amount of feed within the bin, and other data.

28 Claims, 8 Drawing Figures

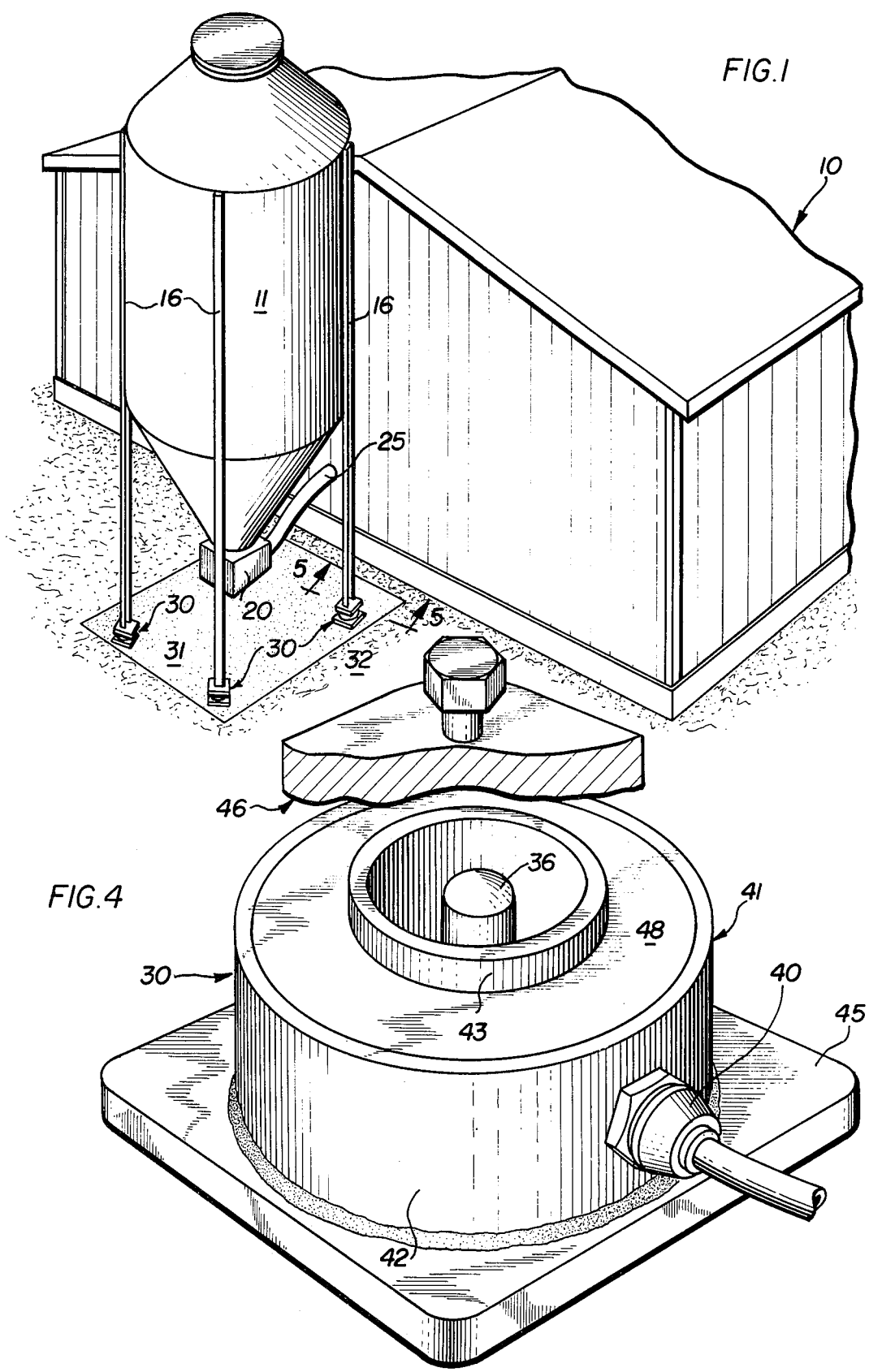

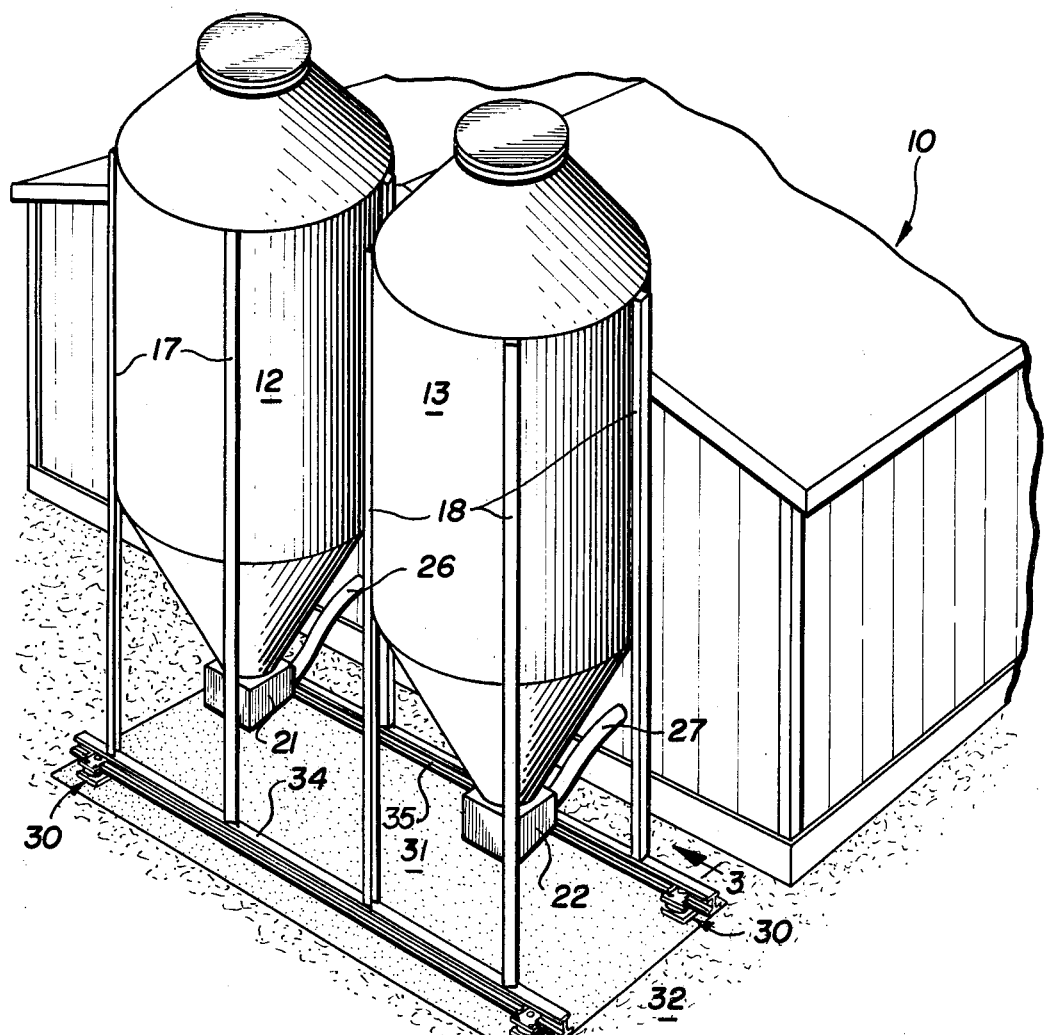
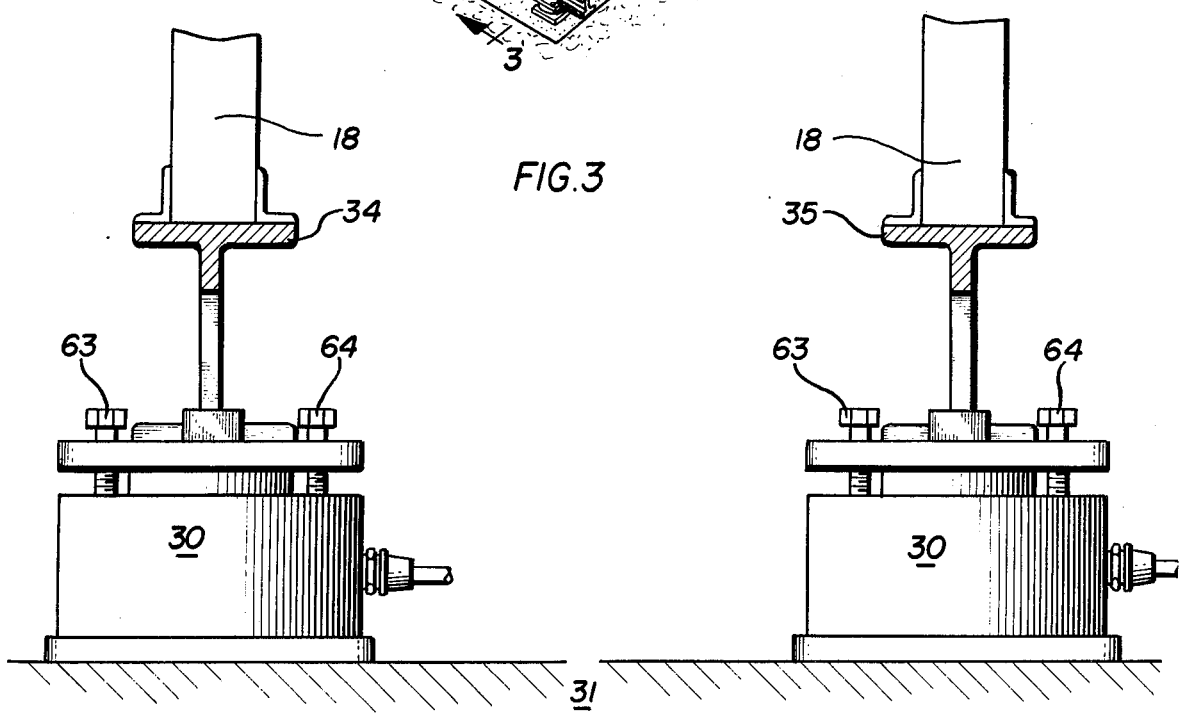

LOAD CELL AND CONTROL FOR BULK BIN

BACKGROUND OF THE INVENTION

This invention relates generally to systems for storing, accurately weighing and dispensing flows of granular substances such as feed for poultry and the like.

Modern animal husbandry businesses such as poultry operations involve feeding large numbers of breeding, laying, or broiling hens to bring the flock to a uniformally high level of performance. To obtain this uniform but high performance level, closely controlled feeding programs are necessary.

More specifically, experimentation has shown that when closely controlled amounts of feed are provided to a poultry flock at closely controlled times, laying hens can convert maximum amounts of feed into egg end product; broiler flocks grow quickly to uniform maximum size; and commercial breeding hens lay relatively large numbers of full size, hatchable eggs.

A number of feed equipment systems have been offered to provide feed to poultry flocks in closely measured amounts. Among such systems which have met with considerable commercial success are those described in U.S. Pat. Nos. 3,598,087, 3,869,006 and 3,904,082; the latter two being especially concerned with delivering closely controlled weights of feed. The success of these systems has caused a demand for similar systems of expanded versitility, which can precisely weigh large amounts of feed and which can provide the system operator with additional data about the performance of his system and flock.

Accordingly, the general object of the present invention is to provide apparatus for accurately weighing large amounts of feed stored in a bulk bin container.

A more specific object is to provide such apparatus which can measure the weight of feed contained within the bin to a high degree of accuracy. A related object is to provide such equipment which will accurately weigh even large or heavy amounts of feed.

Another object is to provide such apparatus which will operate reliably and accurately even in relatively extreme temperature, weather and other environmental conditions.

Yet another object is to provide such apparatus which can monitor and can suitably display a variety of feed reserve and consumption information. Such information can include, for example, the weight of feed remaining within the bin after a number of feedings have been made, the number of feedings available from the bin if a given weight of feed is dispensed per feeding, and the amount of feed dispensed during a given time period.

Yet another object is to provide such a system which can be used to deliver precisely weighed increments of feed on an automatic basis. A related object is to provide such a system which will de-energize the feed delivery devices at a given time. Another related object is to provide such a system which will prevent operation of the delivery devices at any time when less than a minimal amount of feed is present within the storage bin.

A further object is to provide such apparatus which can be inexpensively manufactured, installed without extensive difficult, and easily repaired.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing a bulk feed storage bin and the associated delivery monitoring apparatus;

FIG. 2 is a perspective view similar to FIG. 1 but showing an alternate embodiment of the invention associated with a plurality of bins;

FIG. 3 is a sectional view taken substantially in the plane of line 3—3 in FIG. 2;

FIG. 4 is a perspective view showing a typical load cell used in connection with the invention;

DETAILED DESCRIPTION

Figure 5:
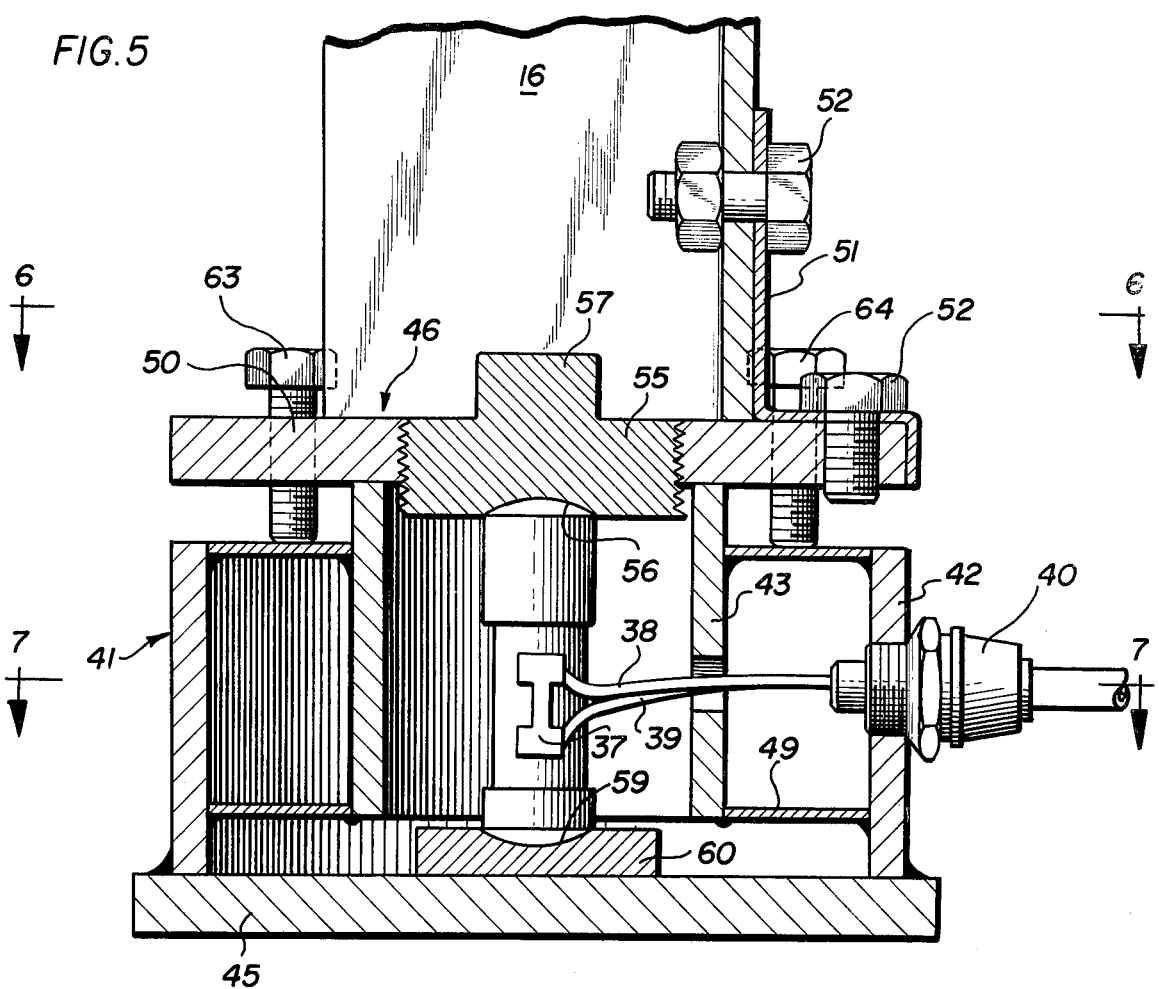
FIG. 5 is a fragmentary sectional view taken substantially in the plane of line 5—5 in FIG. 1.

While the invention will be described in connection with preferred embodiments, it will be understood that it is not intended to limit the invention to these embodiments. On the contrary, it is intended to cover all alternatives, modifications and equivalents as may be included within the spirit and scope of the invention as defined by the appended clams.

Turning first to FIGS. 1 and 2, there is shown a typical animal-sheltering house 10 into which precisely weighted amounts of feed are to be delivered for consumption by the animals on a carefully timed basis. A large reserve of feed can be stored outside this building 10 in a bulk feed bin container 11 as shown in FIG. 1. In some systems, this bin 11 can accept and store several thousand pounds of feed.

If it is necessary or desirable to store even greater amounts of feed, multiple bins 12 and 13 can be erected outside the building, as shown in FIG. 2. These bins are supported in an erect position by appropriate legs 16–18 inclusive. Below the bins 11-13, boots 20–22 and associated conveyor 25–27 move feed from the bins 11-13 into the house 10 for further distribution and ultimate consumption by the poultry or other animals.

Figure 6:
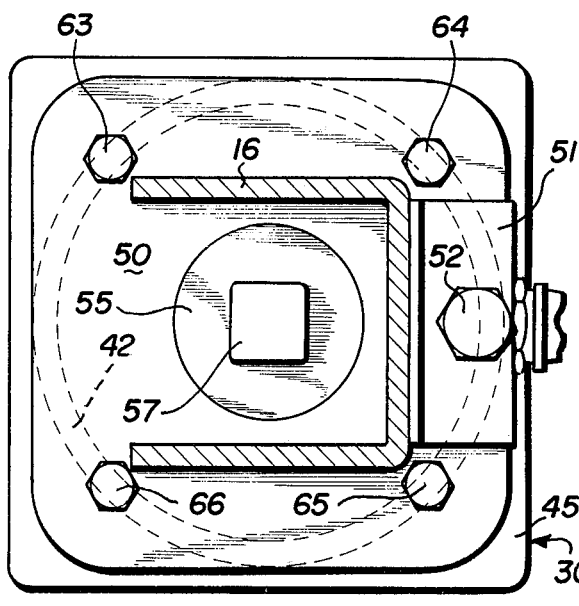
FIG. 6 is a sectional view taken substantially in the plane of line 6—6 in FIG. 5.
Figure 7:
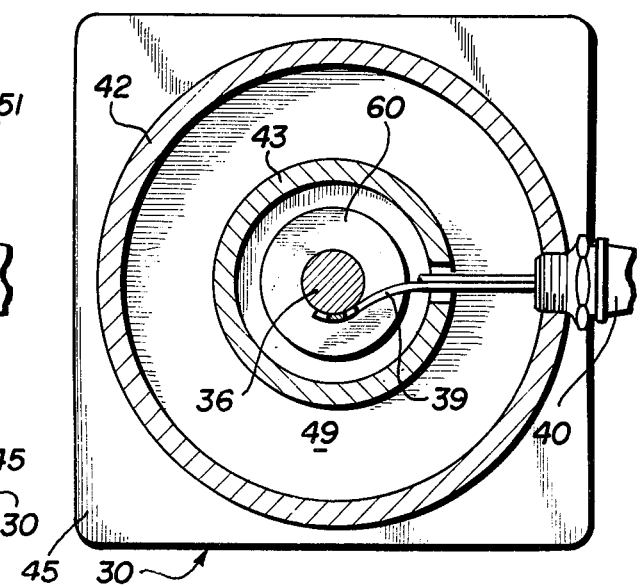
FIG. 7 is a sectional view taken substantially in the plane of line 7—7 in FIG. 5.

In a first embodiment, weight measurement accuracy can be obtained and system construction costs minimized by mounting each bin support leg 16 upon a load cell 30 which is described in further detail below. The load cells 30 are, in turn, carried upon a foundation 31 which can be formed of concrete or other suitable material set within and upon the ground 32. As shown in FIG. 6, these legs 16 can be U-shaped in cross-section to provide access to other parts as described below.

In an alternative embodiment shown in FIG. 2, the load cells 30 are mounted upon an expanded pad 31 and are not connected directly to the bin support legs 17 and 18. Rather, the load cells 30 here support a platform formed of I-beams 34 and 35 which, in turn, carries the support legs 17 and 18. Thus, the foundation 31 can support a number of load cells 30 which in turn support the weight of the platform beams 34 and 35, the bins 12 and 13, and any feed contained within the bins. In this way, only a few load cells 30 will be required to accommodate the loads imposed by many legs 17 and 18. In addition, wind, snow and other transitory loads can be accommodated and their effects upon the system minimized. Here, four cells 30 are provided, and are located at each end of the beams 34 and 35 in the interest of construction and manufacturing economy.

In accordance with another aspect of this invention, the load cell 30 has an electrical characteristic which systematically varies in accordance with the weight of the bin and any contained feed as sensed by the cell. To provide such a low cost cell and an accurate electrical signal in accordance with the invention, the load cell houses a sensor means which here includes a bi-ended slug member 36 aligned in a predetermined direction so as to be deformed or strained in response to the weight of the bin and any feed. Here a transducer 37 is connected to the slug 36 for deformation with the slug 36. Deformation of the slug and transducer produces a consequent change in the electrical characteristic of the transducer. Wires 38 and 39 extend from the transducer 37 through an appropriate fitting 40 to circuitry described below.

To support the sensor or slug 36 in its predetermined orientation relative to the direction in which the weight forces of the bin and any feed contained in the bin, as exerted by the leg 16, are applied to the load cell 30, the load cell further includes a support 41. Here this support 41 comprises two right circular cylinders 42 and 43 which are located concentrically as illustrated in FIGS. 4–7. A first or outer cylinder 42 is secured to a base 45 as by welding or other convenient means, and the second or inner cylinder 43 is secured to a load cell cap 46 in a similar manner. The inner cylinder 43 is connected to the outer cylinder 42 in a cantilever arrangement by an interconnector structure which here comprises two annular disks 48 and 49. This structure insures that the cell cap 46 can move directly toward and away from the base 45 without misalignment, or without causing misalignment of the slug 36 and consequent false transducer electrical signals.

To transfer the weights and forces from the legs 16 directly to the slug 36, the cell cap 46 includes a cap disk 50 affixed to the second cylinder 43 as by weldments or other convenient means and to the leg 16 by any convenient means such as an angle iron bracket 51 and bolt-type fasteners 52. Threaded into the cap disk 50 is a cap plug 55 which directly engages the transducer slug 36 at a rounded slug top 56. Here the cap head 57 is adapted for engagement by a wrench or other suitable tool so that the cap plug 55 can be turned through a range of positions relative to the cap disk 50. In this way, a predetermined amount of strain or deformation can be imparted to the slug 36. In addition, the plug 55 can be removed for slug and transducer servicing. The slug 36 is here directly supported at its opposite round end 59 upon a platform 60 which can be secured to the load cell base 45 as by weldments or other convenient means. The rounded slug ends 56 and 59 encourage slug alignment with the cap 46 and base 45 to cause slug strain in the requisite direction.

To permit the slug 36 and other parts of the load cell 30 to be adjusted or removed for repairs, a jacking mechanism is provided which takes up the load imparted by the leg 16 or platform 34 to the cell-mounted slug 32, and thus relieves strain upon the slug. Here, this jacking mechanism includes a number of jack screws 63–66 which are threadably carried within and on the cap disk 50 and which can be turned into and out of bearing or butting engagement with the outer cylinder 42. When these screws 63–66 are appropriately turned, the cap disk 50 is raised slightly from the slug-bearing position illustrated in FIG. 5, and the weight imparted by the bin leg 16 is transmitted through the screws 63–66 to the outer cylinder 42 and directly to the load cell base 45. In this condition, the cap plug 55 can be withdrawn from the plate 50, thus providing direct access to the slug 36 and the transducer 37. As illustrated in FIG. 3, these jack screws 63–66 can be included in the multiple-bin device, and the platform beams 34 and 35 can be constructed with access holes 69 to permit the screws 63–66 to be manipulated when servicing any of the load cells 30 is desired.

Figure 8:
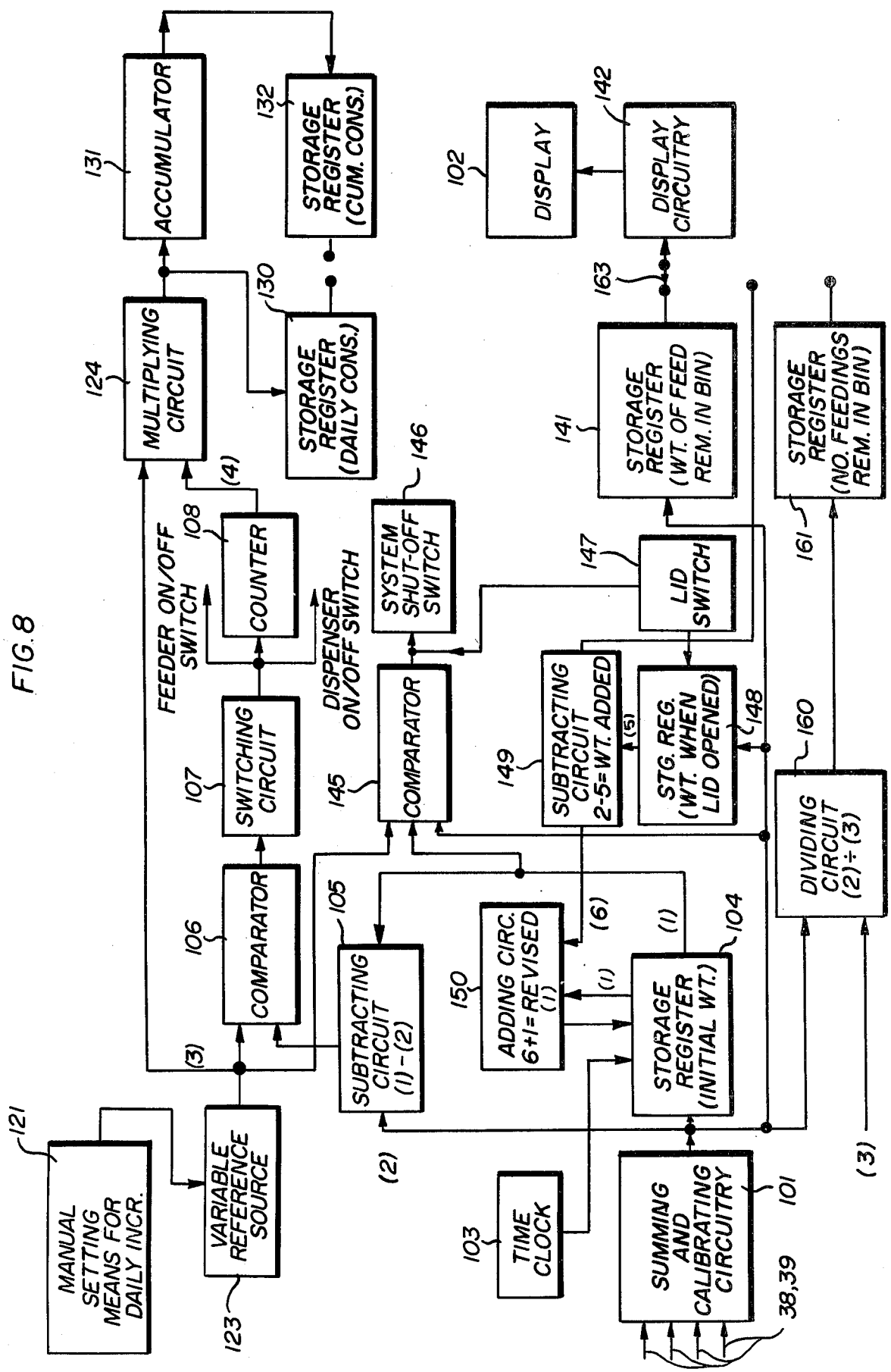
FIG. 8 is a schematic diagram showing the appropriate electrical circuitry which can be used with the novel load cells of the present invention to provide important data to the system user.

The electrical signals transmitted by the wires 38 and 39 can be used to provide a number of important types of data to the system user by appropriate electrical circuitry. A variety of circuits can be used to generate this data. One such circuit for using and modifying these electrical signals is schematically shown in FIG. 8. Here, the electrical signals transmitted by the wires 38 and 39 are applied to appropriate summing and calibrating circuitry 101. A display 102 is provided, which is here of the digital readout variety (e.g., a seven-segment electronic readout). Depending upon desired system uses and the data to be derived and displayed, this display can be of the recording variety, or could take the form of a meter or other suitable apparatus. In addition, it will be understood that this display can be installed at some remote central location where data from a number of such installations are to be monitored.

In accordance with the invention, one form of data which the system user or poultry husbandman may find useful is the amount of feed which has been delivered to the poultry from the bins 11 or bins 12 and 13, as compared to an initial amount of feed originally emplaced within the bins. To this end, the illustrated circuit provides a storage register 104 which receives and stores signal data regarding the initial weight of delivered feed from the summing and calibrating circuitry 101. Data production by the circuit and operation of the associated apparatus is begun by an appropriate signal from a time clock 102. As feed is dispensed from the bin 11 or bins 12 and 13, and corresponding electrical signals are received in the summing circuitry 101, an output signal which corresponds to the instantaneous weight of the feed in the bin 11 or bins 12 and 13 is applied to a subtracting circuit 105. A reference signal from a variable reference source 123, which may be varied by manual setting means 121, is also applied to the comparator 106. The manual setting means 121 may take the form of, for example, thumbwheel or rotary switches coupled to variable resistors for adjusting a voltage level in the variable reference source 123. When the amount of feed dispensed from the bins, as represented by the output signal of the subtracting circuit 105, is substantially equal to the signal from the variable reference source 123, the comparator 106 develops a corresponding signal which may be displayed to the operator of the system and which may be used, if desired, to shut down the system.

In the illustrated embodiment of the invention, the display signal is applied to a switching circuit 107 which controls the bin dispenser mechanisms and the feeder switch to halt feed dispensing when the preselected increment is attained. This switching circuit also thus prevents the feeder from operating during the remaining time period of the feed dispensing operation, as that time period is defined by the time clock 102. The output signal of the switching circuit 107 is also applied to a counter 108 which counts the number of dispensing operations. This count and the reference signal from the variable reference source 123 are applied to a multiplying circuit 124 which develops an output signal corresponding to the total amount of feed dispensed. The output signal of the multiplying circuit 124 is applied to a storage register 130 which operates to store a signal corresponding to the amount of feed dispensed during a given day or other time period. The multiplying circuit 124 also applies a signal to an accumulator 131 and storage register 132 to store a signal corresponding to the cumulative amount of feed dispensed during a period of days or other time increments.

The output signal of the summing and calibrating circuitry 101 is also applied to a storage register 141 which stores a signal corresponding to the weight of feed remaining in the bin 11 or bins 12 and 13. Separate displays may of course be employed for the storage registers 131, 132 and 141 to display a representation of the corresponding signals stored therein without departing from the principles of the invention. In the embodiment of the invention illustrated in FIG. 8, however, a single display and a single-pole, quadruple-throw switch are utilized to selectively display the information stored in register 131, 132 and 141. Display circuitry 142 is employed to convert the signals stored in these registers into a form suitable for application to the display 102.

Another feature of the illustrated embodiment of the invention comprises means for halting system operation when less than a minimum amount of feed is contained within the bin 11 or bins 12 and 13. The output signal from the variable reference source 123 is applied to a comparator 145 together with the output signal from the summing and calibrating circuitry 101. The comparator 145 develops an "empty bin" output signal whenever the weight of feed remaining in the bins is less than the incremental amount set by the manual setting means 121. This "empty bin" signal is used to control a system shut-off switch 146.

Yet another feature of the invention is that no manual resetting or adjustments need be made when bulk amounts of feed are introduced to the bin 11 or bins 12 and 13 as by a truck or other device (not shown). When the addition of feed to the bin or bins is begun during system feed dispensing operations, a lid switch 147 or other device signals the system shut-off switch and halts feed dispensation. In addition, a signal is presented to a storage register 148. This register combines the bin open signal with a signal from the summing and calibration circuitry 101, and sends an instantaneous reading of the feed weight remaining in the bin when the bin was opened to a subtracting circuit 149. As feed is added to the bin, the weight increase is sensed and the corresponding signals are routed through the circuitry 101 and register 104 and are presented to an additive circuit 150. When the bin lid is closed and the switch 147 so signals, the feed-weight-added data signal is added to the initial weight signal in the additive circuit 150, and the dispenser apparatus motors are restarted to finish delivering the preselected feed increment to downstream apparatus.

Another aspect of the embodiment of the invention illustrated in FIG. 8 includes means for displaying the number of feed dispensing operations that have taken place since the bin 11 or bins 12 and 13 were filled. The output signal of the summing and calibrating circuitry 101 and the reference source signal from variable reference source 123 are applied to a divider circuit 160 wherein the former signal is divided by the latter and the resulting quotient signal is applied to a storage register 161 as discussed hereinabove with respect to registers 131, 132 and 141. The signal in the register 161 may be displayed by a separate display circuit or selectively displayed through a switch 163, the display circuitry 142, and the display 102, as illustrated in FIG. 8.

The invention is claimed as follows:

1. A load cell for measuring the weight of a feed container bin and any feed contained therein, the combined weights acting in a given direction, comprising slug means aligned in a predetermined direction and capable of being deformably strained in response to the weight of the bin and any feed applied to the load cell, transducer means connected to the slug means and having an electrical characteristic corresponding to the strain caused to the slug means, and support means for maintaining the slug means in a predetermined orientation relative to the direction in which the weight forces of the container bin and any feed contained therein are applied to the load cell, said support means including a foot adapted to support said slug means at one slug means end, a first cylinder extending upwardly from the foot, first and second annular disks affixed to the first cylinder, a second cylinder affixed to the first and second disks but spaced apart from the slug, foot and first cylinder so as to be cantilevered from the first cylinder, and a cap affixed to the second cylinder and adapted to engage the slug means at an opposite end to maintain the slug means in a desired orientation, and including a cap disk affixed to the second cylinder, and a cap plug carried by the cap disk for engaging the slug means and adjustable through a range of positions relative to the cap disk.

2. A load cell according to claim 1 wherein said cap includes a threaded interconnector means for mounting the cap plug on and in the cap disk in a threaded interconnection.

3. A load cell for measuring the weight of a feed container bin and any feed contained therein, the combined weights acting in a given direction, comprising slug means aligned in a predetermined direction and capable of being deformably strained in response to the weight of the bin and any feed applied to the load cell, transducer means connected to the slug means and having an electrical characteristic corresponding to the strain caused to the slug means, and support means for maintaining the slug means in a predetermined orientation relative to the direction in which the weight forces of the contained bin and any feed contained therein are applied to the load cell, said support means including a foot adapted to support said slug means at one slug means end, a first cylinder extending upwardly from the foot, first and second annular disks affixed to the first cylinder, a second cylinder affixed to the first and second disks but spaced apart from the slug, foot and first cylinder so as to be cantilevered from the first cylinder, and a cap affixed to the second cylinder and adapted to engage this slug means at an opposite end to maintain the slug means in a desired orientation, and jack support means for selectively and directly supporting said cap upon said first cylinder to release strain upon said slug means for load cell servicing.

4. A load cell according to claim 3 wherein said jack support means includes a plurality of jack screws threadably attached to said cap and oriented to bear against said first cylinder.

5. A load cell according to claim 3 including attachment means for securing a bin support member to the load cell to permit the weight of the bin and any feed contained therein to be transferred to the load cell along a path of given direction.

6. A load cell for measuring the weight of a feed container bin and any feed contained therein, comprising deformable sensor means capable of being strained in response to the weight of the feed container bin and any feed therein when said weight is applied to the load cell, and having an electrical characteristic corresponding to the deforming strain applied thereto, and sensor support means for maintaining the deformable sensor means in a predetermined orientation to deformably receive the weight of the bin and any feed, the sensor support means including a base, a cap for receiving the weight of the bin and feed, a first support member affixed to the base and a second support member affixed to the cap, and interconnector means connecting the first support member to the second support member so as to suspend the second member and the attached cap for axial motion relative to the first member, and jack support means for selectively and directly supporting the cap upon the first support member to release strain upon the sensor means for servicing, the jack support means including a plurality of jack screws threadably attached to said cap and oriented to bear against the first support member.

7. A load cell for measuring the weight of a feed container bin and any feed contained therein, the load cell comprising deformable sensor means capable of being deformably strained in response to the weight of the bin and any feed applied to the cells, and having an electrical characteristic corresponding to the deforming strain applied thereto, and sensor support means for maintaining the deformable sensor means in a predetermined orientation to deformably receive the weight of the bin and the feed, said sensor support means including a base, a cap for receiving the weight of the bin and any feed, two concentrically disposed support members, one support member being affixed to the base and the other support member being affixed to the cap, and interconnector means connecting the first support member to the second support member so as to suspend the second member and the attached cap from the first member, the cap including a cap disk affixed to the other support member and a cap plug carried by the cap disk for engaging the plug means, the cap plug being adjustable relative to the cap disk through a range of positions.

8. A load cell according to claim 7 including threaded interconnector means for mounting said cap plug on and in said cap disk in a threaded interconnection.

9. Apparatus for measuring the weight of feed in at least one feed-containing bin which is at least occasionally subjected to transitory side thrust loads, comprising in combination, a foundation, a plurality of electrical load cells supported by the foundation, each cell having an electrical characteristic which systematically varies in accordance with the load imposed thereon, a platform supported by the load cells and supporting, in turn, all the feed bins and feed contained therein, summing circuitry for collating the signals from the cells to provide a unified output signal for use in displaying data corresponding at least in part to the weight of any feed contained within the bin, the load cells being disposed between the foundation and the platform in an arrangement to substantially cancel the effects of any transitory side load on the bins and the summing circuitry, whereby to provide a unified output signal substantially unaffected by any transitory side loads imposed upon the bins, circuitry for providing an electrical display signal corresponding to the weight of feed subtracted from an initial feed weight, and display means responsive to the display signal for displaying data corresponding to the weight of feed subtracted from the initial feed weight.

10. Apparatus according to claim 9 including electrical circuitry for providing an electrical display signal corresponding to the weight of feed subtracted from an initial feed weight, and display means responsive to the display signal for displaying data corresponding to the weight of feed subtracted from the initial feed weight.

11. Apparatus according to claim 9 including electrical circuitry for providing an electrical display signal corresponding to the weight of feed contained within the bin, and display means responsive to the display signal for displaying data corresponding to the weight of feed contained within the bin.

12. Apparatus according to claim 9 including electrical circuitry for providing an electrical display signal corresponding to the number of feed increments of a given feed weight remaining in the bin, and display means responsive to the display signal for displaying data corresponding to the number of feed increments of a given feed weight remaining in the bin.

13. Apparatus according to claim 9 including electrical circuitry for providing an electrical display signal corresponding to the presence or absence of a predetermined minimum weight of feed within the bin, and display means responsive to the display signal for displaying data corresponding to the presence or absence of a predetermined minimum weight of feed within the bin.

14. Apparatus according to claim 9 including feed delivery control means responsive to the electrical summing circuitry for controlling the delivery of a predetermined amount of feed to a remote source.

15. Apparatus according to claim 9 including means for halting delivery of feed from said bin during the introduction of additional feed to said bin and means for resuming delivery of said predetermined amount of feed after the introduction of additional feed to said bin has been completed.

16. Apparatus for measuring the weight of feed in at least one feed-containing bin, comprising, in combination, a foundation, a plurality of electrical load cells supported by the foundation, each cell having an electrical characteristic which systematically varies in accordance with the load imposed thereon, a platform supported by the load cells and supporting, in turn, all the feed bins and feed contained therein, the load cells being disposed between the foundation and platform, summing circuitry for collating signals from all the cells to provide a unified output signal for use in displaying data corresponding to the weight of any feed contained within the bin, means for halting delivery of feed from said bin during the introduction of additional feed to said bin and means for resuming delivery of said predetermined amount of feed after the introduction of additional feed to said bin has been completed.

17. Apparatus according to claim 16 including electrical circuitry for providing an electrical display signal corresponding to the number of feed increments of a given feed weight remaining in the bin, and display means responsive to the display signal for displaying data corresponding to the number of feed increments of a given feed weight remaining in the bin.

18. Apparatus according to claim 16 including electrical circuitry for providing an electrical display signal corresponding to the presence or absence of a predetermined minimum weight of feed within the bin, and display means responsive to the display signal for displaying data corresponding to the presence or absence of a predetermined minimum weight of feed within the bin.

19. Apparatus according to claim 16 including means for halting delivery of feed from said bin during the introduction of additional feed to said bin and means for resuming delivery of said predetermined amount of feed after the introduction of additional feed to said bin has been completed.

20. Apparatus according to claim 16 including jack means having threaded means for raising the weight of the platform, the bins and any feed within the bins from the load cells to permit servicing the load cells.

21. A load cell for measuring the weight of a feed container bin and any feed contained therein, the combined weights acting in a given direction, comprising slug means having opposite spherical ends of given curvature and being itself aligned in a predetermined direction and capable of being deformably strained in response to the weight of the bin and any feed applied to the load cell, transducer means connected to the slug means having an electrical characteristic corresponding to the strain caused to the slug means, and support means for maintaining the slug means in a predetermined orientation relative to the direction in which the weight forces of the container bin and any feed contained therein applied to the load cell, said support means including a foot having a spherical cavity of curvature substantially equal to the curvature of a given slug end curvature and adapted to support said slug means at one spherical slug means end, a first cylinder extending upwardly from the foot, first and second annular disks affixed to the first cylinder, a second hollow cylinder affixed to the first and second disks and surrounding the slug but spaced apart from the slug, foot and first cylinder so as to be cantalevered from the first cylinder, and a cap affixed to the second cylinder and having a spherical cavity of curvature equal to the curvature of the opposite given slug end and adapted to engage the opposite spherical slug means end to maintain the slug means in a desired orientation.

22. Apparatus for measuring the weight of feed in at least one feed-containing bin which is at least occasionally subjected to transitory side thrust loads, comprising in combination, a foundation, a plurality of electrical load cells mounted atop and supported by the foundation, each cell having an electrical characteristic which systematically varies in accordance with the load imposed thereon, a platform mounted atop and supported by the load cells, all the feed bins and feed contained therein being mounted atop and supported by the platform, and summing circuitry for collating the signals from the cells to provide a unified output signal for use in displaying data, corresponding at least in part to the weight of any feed contained within the bin, the load cells being disposed between the foundation and the platform in an arrangement to substantially cancel the effects of any transitory side load on the bins and the summing circuitry, whereby to provide a unified output signal substantially unaffected by any transitory side loads imposed upon the bins.

23. Apparatus according to claim 22 including electrical circuitry for providing an electrical display signal corresponding to the weight of feed subtracted from an initial feed weight, and display means responsive to the display signal for displaying data corresponding to the weight of feed subtracted from the initial feed weight.

24. Apparatus according to claim 22 including electrical circuitry for providing an electrical display signal corresponding to the weight of feed contained within the bin, and display means responsive to the display signal for displaying data, corresponding to the weight of feed contained within the bin.

25. Apparatus according to claim 22 including electrical circuitry for providing an electrical display signal corresponding to the number of feed increments of a given feed weight remaining in the bin, and display means responsive to the display signal for displaying data corresponding to the number of feed increments of a given feed weight remaining in the bin.

26. Apparatus according to claim 22 including electrical circuitry for providing an electrical display signal corresponding to the presence or absence of a predetermined minimum weight of feed within the bin, and display means responsive to the display signal for displaying data corresponding to the presence or absence of a predetermined minimum weight of feed within the bin.

27. Apparatus according to claim 22 including feed delivery control means responsive to the electrical summing circuitry for controlling the delivery of a predetermined amount of feed to a remote source.

28. Apparatus according to claim 22 including means for halting delivery of feed from said bin during the introduction of additional feed to said bin and means for resuming delivery of said predetermined amount of feed after the introduction of additional feed to said bin has been completed.

* * * * *